UNITED STATES PATENT OFFICE.

SIGMUND HELLER, OF TEPLITZ, AUSTRIA-HUNGARY.

METHOD OF PRODUCING CONDUCTIVE LAYERS ON CERAMIC WARES.

952,901.

Specification of Letters Patent.

Patented Mar. 22, 1910.

No Drawing.

Application filed May 27, 1909. Serial No. 498,745.

*To all whom it may concern:*

Be it known that I, SIGMUND HELLER, a subject of the Emperor of Austria-Hungary, residing at Teplitz, Bohemia, in the Empire of Austria-Hungary, have invented a new and useful Method of Producing Conductive Layers on Ceramic Wares, of which the following is a specification.

Firmly adhering coatings of electro-deposited metals on ceramic wares could hitherto be produced in the galvanic bath only with the aid of a conductive ground, which ground is obtained either by burning in the ware a mixture of enamel and calcined borax with enamel-gold-tombac, or by burning in the ware silver with an inorganic flux. The employment of the considerably cheaper graphite for the named purpose was hitherto not possible with the said methods, since graphite in the hitherto known mixtures could not be converted by burning into a firmly adhering and well conductive layer.

I have discovered, that a conductive layer on ceramic wares can be produced from a mixture of a solution of celluloid in an alcohol with tar, unsaturated hydrocarbons and gold-graphite, the latter preferably of a particular form or composition obtained in manner hereinafter set forth. The said mixture is then applied to the ware and is burned in the same in a muffle at a temperature at about 200° centigrade.

The particular form or composition of gold-graphite which I find best adapted for my process, I make as follows; 3 grams of pure metallic gold are in a known manner turned into protochlorid of gold, to which are added 500 grams of water and 10 grams of cyanid of potassium. This solution is then mixed with 1 kilogram of chemically pure graphite, and the mixture is burned in a muffle-furnace at a temperature of 600° centigrade.

A mixture of 5 parts by weight of unsaturated hydrocarbids and 12 parts by weight of gold-graphite finely ground together in a color-grinding-machine has been found to be particularly suitable. As already mentioned, this mixture is applied to the ware and is burned thereon in a muffle at a temperature of about 200° centigrade.

The layer formed on the ceramic ware according to the new method is not only a good conductor, but it also very firmly adheres with the deposit to the wares.

The further treatment of the wares provided with the conductive layers in the galvanic baths is effected in the usual manner.

The method is particularly suitable for cooking-vessels to be provided with coatings of electro-deposited metals.

I claim:

1. The method of forming conductive layers of ceramic wares, which consists in mixing a solution of celluloid in alcohol, with tar, an unsaturated hydrocarbon and a form of gold-graphite, applying the mixture to the ware and burning it thereon.

2. The method of forming conductive layers on ceramic wares, which consists in first producing a particular form of gold-graphite by converting two parts by weight of metallic gold into protochlorid of gold, adding thereto approximately 500 parts by weight of water and 10 parts by weight of cyanid of potassium, mixing this solution with 1,000 parts by weight of graphite, and burning the mixture in a muffle-furnace, next mixing an amount of this special form of gold-graphite, produced in the manner aforesaid, with a solution of celluloid in alcohol, tar and an unsaturated hydrocarbon, applying the mixture to the ware and burning it thereon.

In witness whereof I have hereunto set my hand this fourteenth day of May 1909 in the presence of two subscribing witnesses.

SIGMUND HELLER.

Witnesses:
HENRY HASPER,
WOLDEMAR HAUPT.